US011321348B2

(12) United States Patent
McAlister et al.

(10) Patent No.: US 11,321,348 B2
(45) Date of Patent: *May 3, 2022

(54) PROVISIONING AND MANAGING REPLICATED DATA INSTANCES

(71) Applicant: Amazon Technologies, Inc., Seattle, WA (US)

(72) Inventors: Grant Alexander MacDonald McAlister, Seattle, WA (US); Swaminathan Sivasubramanian, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

This patent is subject to a terminal disclaimer.

(21) Appl. No.: 15/150,370

(22) Filed: May 9, 2016

(65) Prior Publication Data
US 2016/0253400 A1      Sep. 1, 2016

Related U.S. Application Data

(63) Continuation of application No. 13/621,044, filed on Sep. 15, 2012, now Pat. No. 9,336,292, which is a (Continued)

(51) Int. Cl.
*G06F 16/27*      (2019.01)
*H04L 67/1095*      (2022.01)
(Continued)

(52) U.S. Cl.
CPC .......... *G06F 16/27* (2019.01); *G06F 11/2076* (2013.01); *G06F 16/275* (2019.01);
(Continued)

(58) Field of Classification Search
CPC .......... G06F 17/30575; G06F 11/1456; G06F 17/30215; G06F 11/2069; G06F 3/065;
(Continued)

(56) References Cited

U.S. PATENT DOCUMENTS 5,555,404 A    9/1996   Torbjørnsen et al.
6,018,746 A    1/2000   Hill et al.
(Continued)

FOREIGN PATENT DOCUMENTS

CN    1762154      4/2006
CN    101055538    10/2007
(Continued)

OTHER PUBLICATIONS

Smith David "High Availability and Disaster Recovery at service: A SQL Server 2008 Technical Case Study", publish Aug. 2009.*
(Continued)

*Primary Examiner* — Etienne P Leroux
*Assistant Examiner* — Cindy Nguyen
(74) *Attorney, Agent, or Firm* — Robert C. Kowert; Kowert, Hood, Munyon, Rankin & Goetzel, P.C.

(57) ABSTRACT

A replicated database can be provisioned that provides primary and secondary replicas that can be provisioned in different data zones or geographical locations. The database can be installed on the primary replica, and both the primary and secondary replica can have installed a block level replication mechanism that allows any I/O operation to be replicated by between the primary and secondary replicas. Any failure or outage of the primary replica can be addressed by performing a failover operation to the secondary replica. A DNS name or other such approach can be used such that the name can be aliased to the secondary replica during a failover, such that there is no action needed on the part of the customer to utilize the "new" primary replica. The creation of the database and provisioning of the replicated instance can be initiated using a Web service call to a control environment. A replicated database can also be scaled according to storage or computing capacity with no disrup-
(Continued)

tion of service using a Web service call to the control environment.

20 Claims, 6 Drawing Sheets

Related U.S. Application Data continuation of application No. 12/606,093, filed on Oct. 26, 2009, now Pat. No. 8,335,765.

(51) Int. Cl.
G06F 11/20 (2006.01)
G06F 11/14 (2006.01)
G06F 11/07 (2006.01)

(52) U.S. Cl.
CPC ...... *H04L 67/1095* (2013.01); *G06F 11/0727* (2013.01); *G06F 11/0766* (2013.01); *G06F 11/1446* (2013.01); *G06F 11/2069* (2013.01); *G06F 2201/80* (2013.01)

(58) Field of Classification Search
CPC ............. G06F 11/1469; G06F 11/2056; G06F 11/2064; G06F 16/27; G06F 16/2471; G06F 16/275; G06F 16/29; G06F 16/214
See application file for complete search history.

(56) References Cited

U.S. PATENT DOCUMENTS

| | | |
|---|---|---|
| 6,205,465 B1 | 3/2001 | Schoening et al. |
| 6,442,707 B1 | 8/2002 | McGrath et al. |
| 6,542,907 B1 | 4/2003 | Cohen |
| 6,560,639 B1 | 5/2003 | Dan et al. |
| 6,611,867 B1 | 8/2003 | Bowman-Amuah |
| 6,671,821 B1 | 12/2003 | Castro et al. |
| 6,675,299 B2 | 1/2004 | Porter et al. |
| 6,961,768 B2 | 11/2005 | Davis et al. |
| 6,981,135 B1 | 12/2005 | Trask |
| 6,985,955 B2 | 1/2006 | Gullotta et al. |
| 6,988,139 B1 | 1/2006 | Jervis et al. |
| 7,062,559 B2 | 6/2006 | Yoshimura et al. |
| 7,065,624 B1 | 6/2006 | Zahavi |
| 7,124,289 B1 | 10/2006 | Suorsa |
| 7,133,907 B2 | 11/2006 | Carlson |
| 7,315,826 B1 | 1/2008 | Guheen et al. |
| 7,370,025 B1* | 5/2008 | Pandit ............... G06F 17/30212 707/610 |
| 7,415,484 B1 | 8/2008 | Tulkoff et al. |
| 7,418,484 B2 | 8/2008 | Presley |
| 7,478,263 B1 | 1/2009 | Kownacki et al. |
| 7,502,329 B2 | 3/2009 | Li et al. |
| 7,506,021 B2 | 3/2009 | Polan et al. |
| 7,536,686 B2 | 5/2009 | Tan et al. |
| 7,624,133 B1 | 11/2009 | Ojalvo |
| 7,680,771 B2 | 3/2010 | Cialini et al. |
| 7,769,721 B2 | 8/2010 | Ueoka et al. |
| 7,801,932 B2 | 9/2010 | Krishaswamy |
| 7,966,528 B2 | 6/2011 | Troppmann et al. |
| 7,991,749 B2 | 8/2011 | Nishikawa et al. |
| 8,020,037 B1 | 9/2011 | Schwartz et al. |
| 8,041,679 B1 | 10/2011 | Narayanan |
| 8,078,587 B2 | 12/2011 | Wahlert et al. |
| 8,121,981 B2 | 2/2012 | Simek et al. |
| 8,150,808 B2 | 4/2012 | Zha et al. |
| 8,150,904 B2 | 4/2012 | Queck et al. |
| 8,156,082 B2 | 4/2012 | Srivastava et al. |
| 8,307,003 B1* | 11/2012 | Sheth ............... G06F 17/3089 707/790 |
| 8,334,765 B2 | 12/2012 | Weinstein et al. |
| 8,352,608 B1 | 1/2013 | Keagy et al. |
| 8,364,460 B2 | 1/2013 | Ostermeyer et al. |
| 8,392,915 B2 | 3/2013 | Friedman et al. |
| 9,336,292 B2 | 5/2016 | McAlister et al. |
| 2002/0019844 A1 | 2/2002 | Kurowski et al. |
| 2002/0147709 A1 | 10/2002 | Rajarajan et al. |
| 2003/0005091 A1 | 1/2003 | Ullmann et al. |
| 2003/0212775 A1 | 11/2003 | Steele et al. |
| 2003/0212898 A1 | 11/2003 | Steele et al. |
| 2004/0073676 A1 | 4/2004 | Honma et al. |
| 2004/0078637 A1 | 4/2004 | Fellin et al. |
| 2004/0098425 A1 | 5/2004 | Wiss et al. |
| 2004/0139128 A1* | 7/2004 | Becker ............... G06F 11/1456 |
| 2004/0148443 A1 | 7/2004 | Achiwa |
| 2004/0163008 A1 | 8/2004 | Kim |
| 2004/0172509 A1 | 9/2004 | Takeda et al. |
| 2004/0174823 A1 | 9/2004 | Steele et al. |
| 2004/0225659 A1 | 11/2004 | O'Brien et al. |
| 2005/0004999 A1 | 1/2005 | Moore et al. |
| 2005/0027845 A1 | 2/2005 | Secor et al. |
| 2005/0038831 A1 | 2/2005 | Souder et al. |
| 2005/0120025 A1* | 6/2005 | Rodriguez ............ G06F 16/162 |
| 2005/0193245 A1 | 9/2005 | Hayden et al. |
| 2005/0210128 A1 | 9/2005 | Cannon et al. |
| 2005/0216788 A1 | 9/2005 | Mani-Meitav et al. |
| 2005/0243611 A1 | 11/2005 | Lubbers et al. |
| 2005/0262164 A1 | 11/2005 | Guiheneuf et al. |
| 2005/0283655 A1 | 12/2005 | Ashmore |
| 2006/0036761 A1 | 2/2006 | Amra et al. |
| 2006/0041641 A1 | 2/2006 | Breiter et al. |
| 2006/0053251 A1 | 3/2006 | Nicholson et al. |
| 2006/0104231 A1 | 5/2006 | Gidwani |
| 2006/0106675 A1 | 5/2006 | Cohen et al. |
| 2006/0106774 A1 | 5/2006 | Cohen et al. |
| 2006/0136448 A1* | 6/2006 | Cialini ............. G06F 17/30306 |
| 2006/0242443 A1* | 10/2006 | Talius ............... G06F 17/30176 713/400 |
| 2007/0022122 A1 | 1/2007 | Bahar et al. |
| 2007/0061266 A1 | 3/2007 | Moore et al. |
| 2007/0061487 A1 | 3/2007 | Moore et al. |
| 2007/0078982 A1* | 4/2007 | Aidun ................ G06F 11/2025 709/225 |
| 2007/0083588 A1 | 4/2007 | Keller et al. |
| 2007/0156842 A1* | 7/2007 | Vermeulen ........ H04L 29/06047 709/217 |
| 2007/0156872 A1 | 7/2007 | Stoyanova |
| 2007/0162420 A1 | 7/2007 | Ou et al. |
| 2007/0168336 A1* | 7/2007 | Ransil ................ G06F 16/958 |
| 2007/0174691 A1 | 7/2007 | D'Souza et al. |
| 2007/0185932 A1 | 8/2007 | Teodosiu et al. |
| 2007/0192329 A1 | 8/2007 | Croft et al. |
| 2007/0234028 A1 | 10/2007 | Rothman et al. |
| 2007/0234115 A1 | 10/2007 | Saika |
| 2007/0244937 A1 | 10/2007 | Flynn, Jr. et al. |
| 2007/0244996 A1 | 10/2007 | Ahmed et al. |
| 2007/0260693 A1 | 11/2007 | Cardone et al. |
| 2007/0260696 A1 | 11/2007 | Bohannon et al. |
| 2007/0260912 A1 | 11/2007 | Hatasaki et al. |
| 2007/0271275 A1 | 11/2007 | Fassette et al. |
| 2007/0283443 A1 | 12/2007 | McPherson et al. |
| 2007/0288526 A1 | 12/2007 | Mankad et al. |
| 2007/0299828 A1 | 12/2007 | Lewis et al. |
| 2008/0016293 A1 | 1/2008 | Saika |
| 2008/0040509 A1 | 2/2008 | Werb et al. |
| 2008/0065650 A1 | 3/2008 | Kim et al. |
| 2008/0109448 A1 | 5/2008 | Aboel-Nil et al. |
| 2008/0126734 A1 | 5/2008 | Murase |
| 2008/0134176 A1 | 6/2008 | Fitzgerald et al. |
| 2008/0134178 A1 | 6/2008 | Fitzgerald et al. |
| 2008/0162590 A1 | 7/2008 | Kundu et al. |
| 2008/0183991 A1 | 7/2008 | Cosmadopoulos et al. |
| 2008/0189413 A1 | 8/2008 | Srivastava et al. |
| 2008/0189769 A1 | 8/2008 | Casado et al. |
| 2008/0195622 A1 | 8/2008 | Lelcuk et al. |
| 2008/0244579 A1 | 10/2008 | Muller |
| 2008/0256384 A1 | 10/2008 | Branson et al. |
| 2008/0263388 A1 | 10/2008 | Allen et al. |
| 2008/0301663 A1 | 12/2008 | Bahat et al. |
| 2009/0006888 A1 | 1/2009 | Bernhard et al. |
| 2009/0019137 A1 | 1/2009 | Mishra et al. |
| 2009/0019535 A1 | 1/2009 | Mishra et al. |
| 2009/0037425 A1 | 2/2009 | Erickson et al. |

(56) References Cited

U.S. PATENT DOCUMENTS

| | | | |
|---|---|---|---|
| 2009/0063509 A1 | 3/2009 | Lockhart et al. | |
| 2009/0063563 A1 | 3/2009 | Khangaonkar et al. | |
| 2009/0106411 A1 | 4/2009 | Lisiecki et al. | |
| 2009/0138577 A1 | 5/2009 | Casado et al. | |
| 2009/0164853 A1 | 6/2009 | Gokhale et al. | |
| 2009/0198940 A1 | 8/2009 | Ash et al. | |
| 2009/0216881 A1 | 8/2009 | Lovy et al. | |
| 2009/0271656 A1 | 10/2009 | Yokota et al. | |
| 2009/0327519 A1* | 12/2009 | Thiel | G06F 11/2025 709/239 |
| 2009/0328065 A1 | 12/2009 | Wookey | |
| 2010/0005531 A1 | 1/2010 | Largman et al. | |
| 2010/0036851 A1 | 2/2010 | Paterson-Jones et al. | |
| 2010/0037031 A1* | 2/2010 | DeSantis | G06F 3/0619 711/162 |
| 2010/0077160 A1 | 3/2010 | Liu et al. | |
| 2010/0114824 A1* | 5/2010 | Krishnaprasad | G06F 11/2094 707/637 |
| 2010/0125555 A1 | 5/2010 | Lau et al. | |
| 2010/0161558 A1 | 6/2010 | Goldberg et al. | |
| 2010/0169707 A1 | 7/2010 | Mathew et al. | |
| 2010/0191713 A1 | 7/2010 | Lomet et al. | |
| 2010/0198972 A1 | 8/2010 | Umbehocker | |
| 2010/0211548 A1 | 8/2010 | Ott et al. | |
| 2010/0250499 A1 | 9/2010 | McAlister et al. | |
| 2010/0250748 A1 | 9/2010 | Sivasubramanian et al. | |
| 2010/0251002 A1 | 9/2010 | Sivasubramanian et al. | |
| 2010/0251242 A1 | 9/2010 | Sivasubramanian et al. | |
| 2010/0251339 A1 | 9/2010 | McAlister | |
| 2010/0262650 A1 | 10/2010 | Chauhan et al. | |
| 2011/0004457 A1 | 1/2011 | Haviv et al. | |
| 2011/0004916 A1 | 1/2011 | Schiffman et al. | |
| 2011/0083138 A1 | 4/2011 | Sivasubramanian et al. | |
| 2011/0099146 A1 | 4/2011 | McAlister et al. | |
| 2011/0099147 A1 | 4/2011 | McAlister et al. | |
| 2011/0099420 A1 | 4/2011 | MacDonald McAlister et al. | |
| 2011/0178793 A1 | 7/2011 | Giffin et al. | |
| 2011/0288847 A1 | 11/2011 | Narayanan et al. | |
| 2013/0251339 A1* | 9/2013 | Crowder | H04N 21/23439 386/241 |

FOREIGN PATENT DOCUMENTS

| | | |
|---|---|---|
| CN | 101501668 | 8/2009 |
| EP | 1415236 | 5/2004 |
| JP | 10-312327 | 11/1998 |
| JP | 2005-2567056 | 9/2005 |
| JP | 2006-011874 | 1/2006 |
| JP | 2009-230742 | 10/2009 |
| WO | 2004090686 | 10/2004 |

OTHER PUBLICATIONS

U.S. Appl. No. 12/418,475, filed Apr. 3, 2009, Sheth.
International Search Report dated May 25, 2010 for International Application No. PCT/US10/029476 filed on Mar. 31, 2010, 2 pages.
International Search Report dated Dec. 2, 2010 for International Application No. PCT/US10/051757 filed on Oct. 7, 2010, 2 pages.
International Search Report dated Dec. 21, 2010 for International Application No. PCT/US10/54133 filed on Oct. 26, 2010, 2 pages.
International Search Report dated Dec. 21, 2010 for International Application No. PCT/US10/54139 filed on Oct. 26, 2010, 2 pages.
International Search Report dated Dec. 21, 2010 for International Application No. PCT/US10/54141 filed on Oct. 26, 2010, 2 pages.
James R. Cordy, Practical Langauage-Independent Detection of Near-Miss Clones, ACM, 2004, 12 pages.
Yi Wang, Virtual Routers on the Move: Live Router Migration as a Network-Management Primitive, ACM, 2008, 12 pages.
David Lomet, Recovery from "Bad" User Transactions, ACM, 2006, 10 pages.
Sanjay Ghemawat, The Google File System, ACM, 2003, 15 pages.
Brett Battles, Reducing Data Center Power Consumption Through Efficient Storage, Google Scholar, 2007, 9 Pages.
Tirthankar Lahiri, Cache Fusion: Extending Shared-Disk Clusters with Shared Caches, Google Scholar, 2001, 4 pages.
Ralph Mietzner, et al., "Towards Provisioning the Cloud: On the Usage of Multi-Granularity Flows and Services to Realize a Unified Provisioning Infrastructure for Saas Applications," 2008 IEEE Congress on Services—Part 1, pp. 3-10.
"Oracle9i SQL Reference," Oct. 2002, Oracle Corporation, pp. 1-1 to 1-3.
"Non Final Office Action dated Jan. 31, 2014", U.S. Appl. No. 12/415,998 20 pages.
"Notice of Allowance dated Nov. 13, 2013", U.S. Appl. No. 12/606,106.
"Notice of Allowance dated Nov. 19, 2013", Japan Application 2012-536964.
"Notice of Allowance dated Nov. 19, 2013", Japan Application 2012-536966.
"Notice of Allowance dated Nov. 20, 2013", U.S. Appl. No. 12/606,106.
"Notice of Allowance dated Dec. 26, 2013", U.S. Appl. No. 12/415,958.
"Notice of Allowance dated Dec. 30, 2013", U.S. Appl. No. 13/620,999.
"Notice of Allowance dated Dec. 30, 2013", U.S. Appl. No. 13/621,073.
"Supplemental Notice of Allowance dated Oct. 25, 2013", U.S. Appl. No. 13/294,099.
"Examination Report dated Oct. 19, 2012", Singapore Application 201202870-0, dated Oct. 19, 2012, 8 pages.
"Examination Report dated Oct. 29, 2012", Singapore Application 201202868-4, dated Oct. 29, 2012, 5 pages.
"Examination Report dated Oct. 9, 2012", Singapore Application 201107040-6, dated Oct. 9, 2012, 5 pages.
"Examination Report dated Dec. 11, 2012", Singapore Application 201202502-9, dated Dec. 11, 2012, 8 pages.
"Examination Report dated May 17, 2013", Singapore Application 201202967-4, dated May 17, 2013, 10 pages.
"Extended European Search Report dated Sep. 19, 2013", Europe Application 10827392.1, dated Sep. 19, 2013, 6 pages.
"Final Office Action dated Oct. 14, 2011", U.S. Appl. No. 12/415,958, filed Oct. 14, 2011, 34 pages.
"Final Office Action dated Oct. 16, 2012", U.S. Appl. No. 12/575,381, filed Oct. 16, 2012, 42 pages.
"Final Office Action dated Oct. 19, 2011", U.S. Appl. No. 12/418,475, filed Oct. 19, 2011, 26 pages.
"Final Office Action dated Nov. 1, 2012", U.S. Appl. No. 12/606,106, filed Nov. 1, 2012, 29 pages.
"Final Office Action dated Dec. 19, 2011", U.S. Appl. No. 12/415,968, filed Dec. 19, 2011.
"Final Office Action dated Feb. 22, 2013", U.S. Appl. No. 13/294,099, filed Feb. 22, 2013.
"Final Office Action dated Mar. 22, 2011", U.S. Appl. No. 12/415,998, filed Mar. 22, 2011.
"Final Office Action dated May 8, 2013", U.S. Appl. No. 12/416,017, filed May 8, 2013.
"Non Final Office Action dated Jan. 2, 2013", U.S. Appl. No. 13/620,962, filed Jan. 2, 2013.
"Non Final Office Action dated Oct. 14, 2010", U.S. Appl. No. 12/415,998, filed Oct. 14, 2010.
"Non Final Office Action dated Dec. 14, 2010", U.S. Appl. No. 12/415,987, filed Dec. 14, 2010.
"Non Final Office Action dated Feb. 14, 2011", U.S. Appl. No. 12/606,007, filed Feb. 14, 2011.
"Non Final Office Action dated Mar. 14, 2012", U.S. Appl. No. 12/606,003, filed Mar. 14, 2012, 24 pages.
"Non Final Office Action dated Mar. 18, 2013", U.S. Appl. No. 13/299,601, filed Mar. 18, 2013.
"Non Final Office Action dated Apr. 18, 2012", U.S. Appl. No. 12/575,381, filed Apr. 18, 2012, 31 pages.
"Non Final Office Action dated Apr. 29, 2011", U.S. Appl. No. 12/415,968, filed Apr. 29, 2011, 30 pages.
"Non Final Office Action dated May 2, 2011", U.S. Appl. No. 12/418,475, filed May 2, 2011, 20 pages.

(56) References Cited

OTHER PUBLICATIONS

"Non Final Office Action dated May 2, 2011", U.S. Appl. No. 12/415,958, filed May 2, 2011, 23 pages.
"Non Final Office Action dated May 28, 2013", U.S. Appl. No. 12/606,106, filed May 28, 2013.
"Non Final Office Action dated May 31, 2012", U.S. Appl. No. 12/606,106, filed May 31, 2012, 29 pages.
"Non Final Office Action dated Jun. 20, 2013", U.S. Appl. No. 13/620,999, filed Jun. 20, 2013.
"Non Final Office Action dated Jun. 20, 2013", U.S. Appl. No. 13/621,073, filed Jun. 20, 2013.
"Non Final Office Action dated Jul. 23, 2013", Japan Application 2012-538964, dated Jul. 23, 2013.
"Non Final Office Action dated Jul. 23, 2013", Japan Application, 2012-536966, dated Jul. 23, 2013.
"Non Final Office Action dated Aug. 19, 2011", U.S. Appl. No. 12/416,017, filed Aug. 19, 2011.
"Non Final Office Action dated Sep. 13, 2012", U.S. Appl. No. 13/294,099, filed Sep. 13, 2012.
"Non Final Office Action dated Sep. 14, 2012", U.S. Appl. No. 13/299,601, filed Sep. 14, 2012, 15 pages.
"Notice of Allowance dated Oct. 24, 2012", U.S. Appl. No. 12/606,093, filed Oct. 24, 2012, 13 pages.
"Notice of Allowance dated Nov. 13, 2012", U.S. Appl. No. 12/415,968, filed Nov. 13, 2012.
"Notice of Allowance dated Mar. 16, 2012", U.S. Appl. No. 12/418,475, filed Mar. 16, 2012, 11 pages.
"Notice of Allowance dated Mar. 9, 2012", U.S. Appl. No. 12/415,958, filed Mar. 9, 2012, 29 pages.
"Notice of Allowance dated Apr. 15, 2011", U.S. Appl. No. 12/415,987, filed Apr. 15, 2011.
"Notice of Allowance dated Apr. 18, 2013", U.S. Appl. No. 13/620,962, filed Apr. 18, 2013.
"Notice of Allowance dated Jun. 1, 2012", U.S. Appl. No. 12/415,968, filed Jun. 1, 2012.
"Notice of Allowance dated Jun. 26, 2012", U.S. Appl. No. 12/606,093, filed Jun. 26, 2012, 8 pages.
"Notice of Allowance dated Jun. 28, 2012", U.S. Appl. No. 12/418,475, filed Jun. 28, 2012, 20 pages.
"Notice of Allowance dated Jul. 12, 2011", U.S. Appl. No. 12/606,097, filed Jul. 12, 2011.
"Notice of Allowance dated Jul. 5, 2012", U.S. Appl. No. 12/415,958, filed Jul. 5, 2012, 14 pages.
"Notice of Allowance dated Jul. 9, 2013", Japan Application No. 2012-533307, dated Jul. 9, 2013.
"Notice of Allowance dated Aug. 12, 2013", U.S. Appl. No. 13/299,601, filed Aug. 12, 2013.
"Notice of Allowance dated Aug. 26, 2013", U.S. Appl. No. 13/620,962, filed Aug. 26, 2013.
"Notice of Allowance dated Aug. 8, 2011", U.S. Appl. No. 12/415,987, filed Aug. 8, 2011.
"Written Opinion dated Oct. 2, 2012", Singapore Application 201202967-4, dated Oct. 2, 2012, 14 pages.
"Written Opinion dated Feb. 15, 2012", Singapore Application 201107040-6, dated Feb. 15, 2012, 6 pages.
Non-Final Office Action dated Apr. 9, 2014; in corresponding U.S. Appl. No. 12/416,017.
Notice of the First Office Action dated Apr. 1, 2014; in corresponding Chinese patent application No. 201080053676.7.
Notice of the First Office Action dated May 5, 2014; in corresponding Chinese patent application No. 201080056311.X.
Notice of the First Office Action dated Apr. 21, 2014; in corresponding Chinese patent application No. 201080056327.0.
Non-Final Office Action dated Jul. 30, 2014; in corresponding U.S. Appl. No. 12/575,381.
Final Office Action dated Jul. 22, 2014; in corresponding U.S. Appl. No. 12/415,998.
Notice of the First Office Action dated Jun. 12, 2014; in corresponding Chinese patent application No. 201080049395.4.
Office Action dated Apr. 14, 2014; in corresponding Canadian patent application No. 2,776,384.
Office Action dated Apr. 3, 2014; in corresponding Canadian patent application No. 2,778,110.
Tate, et al.; IBM Redbook; SAN Volume Controller: Best Practices and Performance Guidelines ; published on Jul. 2007.
Pollock: Unix/Linux Administration Logical Volume Management Guide; http://content.hccfl.edu/pollock/aunix1/ivm.htm; published in 2005 and retrieved on Jul. 6, 2014.
MacIsaac et al.; IBM Redbook; z/VM and Linx on IBM system z—The virtualization Cookbook for Red hat Enterprise Linux 5.2, Oct. 2008.
English abstract for CN101501668; published on Aug. 5, 2000 and retrieved on Aug. 6, 2014.
Office Action from European Application No. 10827392.1, dated Oct. 29, 2018, Amazon Technologies, Inc., pp. 1-8.
Office Action from Indian Application No. 996/KOLNP/2012, dated Jun. 22, 2018, pp. 1-7.
Office Action from Chinese Application No. 201610843899.2, (Amazon Technologies, Inc.), dated Sep. 4, 2019, (English translation and Chinese version), pp. 1-16.
Extended European Search Report from Application No. 20176089.9-1213, dated Dec. 22, 2021, pp. 1-9.
Kai Shen, et al., "Neptune: Scalable Replication Management and Programming Support for Cluster-based Network Services", USENIX, The Advanced Computing Systems Association, Jan. 5, 2002, pp. 1-12.
Indian Hearing Notice from Application No. 996/KOLNP/2012, dated Sep. 20, 2020, pp. 1-3.
Zhan Wen-Tao et al, "Research and design of remote logical volume replication system based on FreeBSD", vol. 26, No. 3, dated Mar. 2009, pp. 959-962.

\* cited by examiner

PROVISIONING AND MANAGING REPLICATED DATA INSTANCES

CROSS REFERENCE TO RELATED APPLICATION

This application is a continuation of U.S. patent application Ser. No. 13/621,044, filed Sep. 15, 2012, now U.S. Pat. No. 9,336,292, which is a continuation of U.S. patent application Ser. No. 12/606,093, filed Oct. 26, 2009, now U.S. Pat. No. 8,335,765, which are hereby incorporated herein by reference in their entireties for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

While aspects of various applications and resources can be adjusted and managed in the cloud, the data repositories upon which these applications and resources rely are not similarly adjustable or easily managed by a customer or other such user. Typically, performing tasks such as provisioning and scaling data storage are tedious manual procedures, in which a customer has to provide a database administrator (DBA) or similar expert user with configuration information and requirements, such that the DBA can determine whether the configuration is valid. Further, there is no easy way for a customer to dynamically and/or automatically adjust the parameters for a database instance or manage other such aspects of a data repository. In many cases, a data instance will have backup and recovery mechanisms in place, but these mechanisms often are in a single location or area such that they are susceptible to failure or outages in that area.

BRIEF DESCRIPTION OF THE DRAWINGS

Various embodiments in accordance with the present disclosure will be described with reference to the drawings, in which.

DETAILED DESCRIPTION

Figure 1:
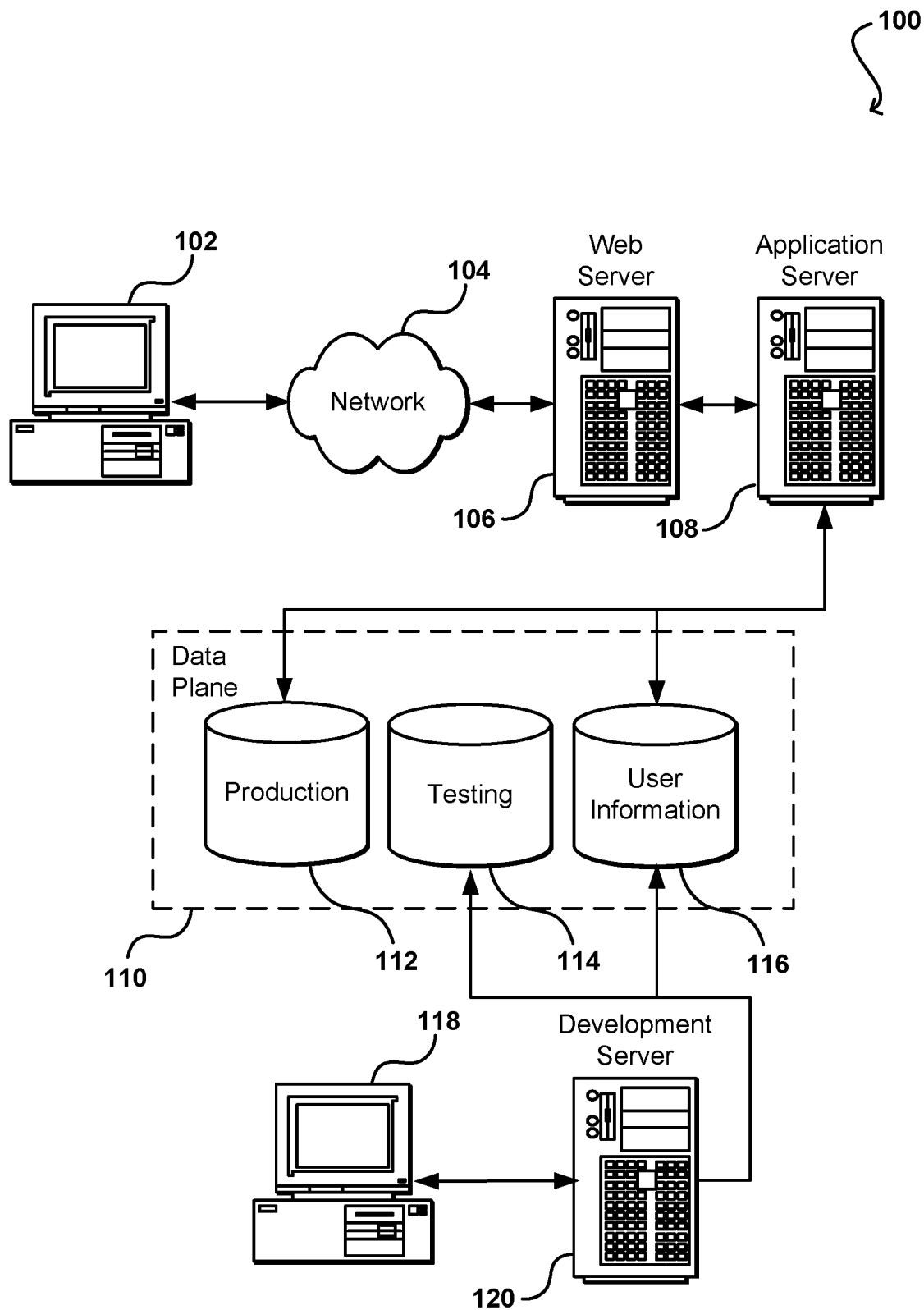
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of data storage in an electronic environment. In particular, various embodiments provide a separate control environment, or control plane, that can be used to enable a user to manage and/or alter various aspects of a data environment, or data plane. This "self-service" functionality can be provided via a set of Web services, enabling the user and control plane to act together as a virtual database administrator (DBA). A user or customer can submit a request to the control plane through one of a plurality of externally-visible application programming interfaces (APIs), for example. Various APIs can be used to perform specific functions with respect to a data repository, such as a relational database, in the data environment. A request received to one of the APIs can be analyzed to determine the desired action(s) to be performed in the data plane, such as actions that adjust operational or configuration parameters of a data store or data storage instance. A component such as a workflow component can determine the appropriate tasks for the action, and cause the tasks to be executed in an appropriate order. At least one of these tasks typically will be performed in the data environment, such as to adjust an aspect of a relational database.

In accordance with certain embodiments, such a system can provide for the provisioning of a replicated data instance in the data environment. The provisioning can utilize a primary-secondary replication approach, with each of the primary and secondary replicas being provisioned in or across one or more separate data zones, separate geographic locations, etc. The database replicas can run on separate data instances, each attached to dedicated block storage volumes that are not shared across the replicas.

In various embodiments, replication can be performed using a block-level replication mechanism, such as a Distributed Replicated Block Device (DRBD®) from Linbit of Vienna, Austria, or an Elastic Block Store (EBS), as provided by Amazon.com, Inc., of Seattle, Wash., which can mirror the content of block devices between servers and synchronously replicate data across redundant systems. Each instance can run a kernel that has a block-level replication mechanism kernel module installed for managing all input and output (I/O) operations for the data instance. All reads and writes can be executed at a primary replica, with the block-level replication mechanism replicating the information synchronously with the secondary replica.

Both the primary and secondary replicas can have an external facing DNS name. Customers can reach the current primary replica using a DNS name such as DNS_primary. The DNS_primary name can alias or "cname" to the external DNS name of the (current) primary replica. When a primary replica fails or is otherwise unavailable, the secondary replica can be promoted or failed over to become the new primary replica, whereby the cname for DNS_primary can update to the DNS name of the new primary instance. All writes are sent to the database on the current primary replica. When the primary instance receives a write, the information is synchronously written to the secondary replica. Upon successful write at both places, the write can be deemed successful. All reads also are executed only at the primary replica in various embodiments.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide a relational database service ("RDS") that enables developers, customers, or other authorized users to easily and cost-effectively obtain and configure relational databases and other such data sources so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
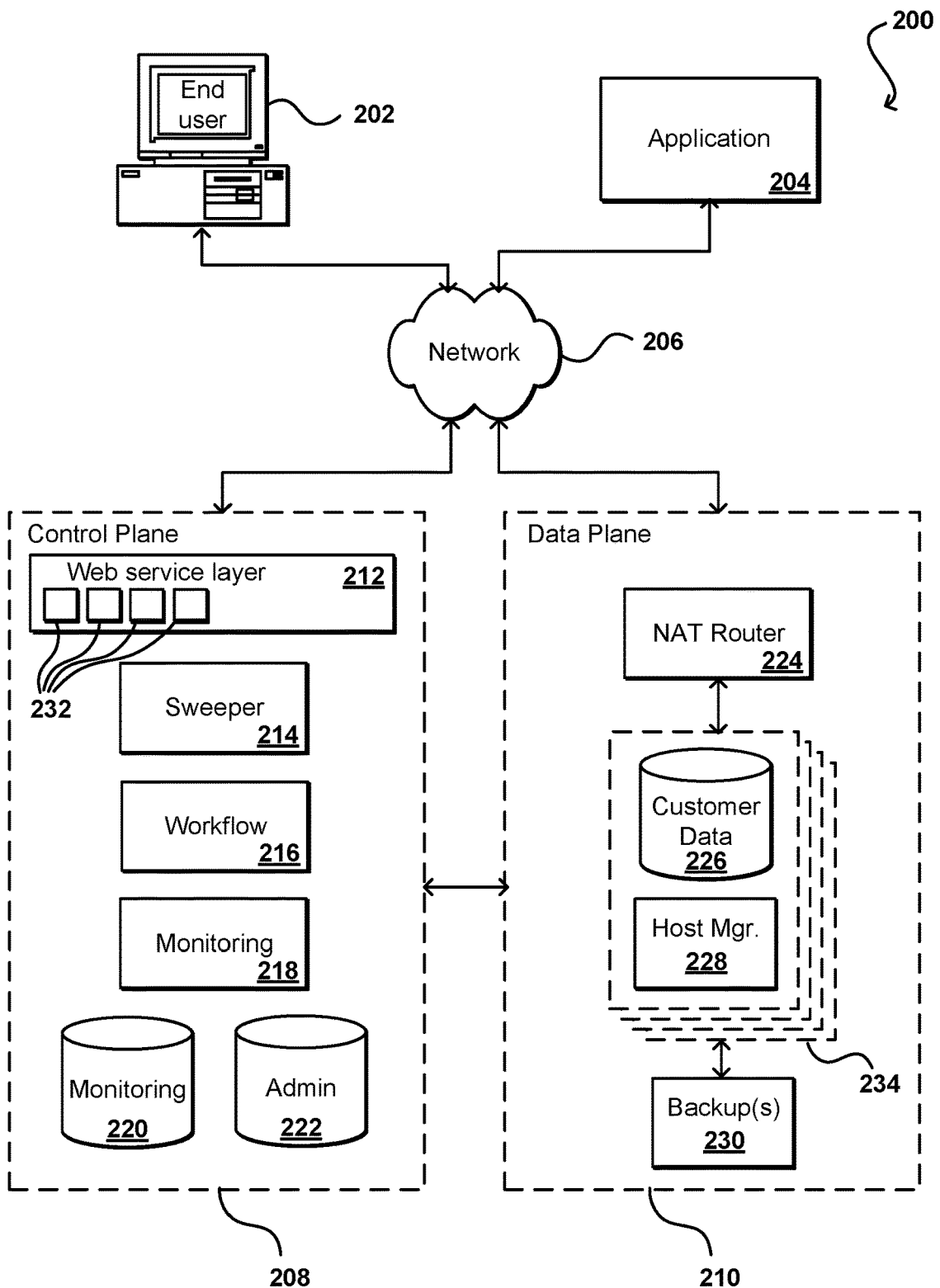
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a geographical region, or near a geographical location, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as provisioning a data store instance, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

As discussed, one advantage to providing the functionality of a control plane as a Web service or other such service is that the control plane functions as a virtual database administrator (DBA) and avoids the need for a human DBA to perform tasks such as provisioning data. Provisioning data is presently a tedious manual procedure, requiring a DBA to receive the necessary configuration information, determine whether the configuration is valid, optimize and tune the instance, and perform other such tasks, which take a significant amount of time and effort. Further, such an approach provides many opportunities for error, which might not be discovered until after data is lost. Using a control plane or service as described herein, a user or customer can instead submit a call including information such as a type of hardware and a version of a database product. The control plane or service can then perform the necessary tasks to create, delete, modify, expand, or otherwise modify a data store or data storage instance. The control plane also can support several different database engines in a consistent fashion, without requiring a DBA to be an expert in each of the engines. Once provisioned, the user has native access to the data instance(s), and can simply point existing applications (such as MySQL applications) to the DNS address or other location information for the particular instance. There is no restriction or modification of query models or other such functionality, as a user can continue to use applications built on MySQL, Oracle, or other database technology.

Systems and methods in accordance with various embodiments enable customers to utilize Web services, or a similar such approach, to create one or more replicated database instances in a cloud computing or similar environment, providing a highly durable and highly available data solution. When a customer creates a replicated database instance in various embodiments, the customer data is synchronously replicated using a primary-secondary replication model. In some embodiments, the replicas can be located in different physical locations, such as in different data zones. Each data "zone" can refer to one or more data centers, or groups of data servers, for example, located within a specific geographical area, with different zones being located at or around different geographic locations. An RDS instance then can tolerate the failure of one of the data zones, as another data zone at a different geographic location can likely avoid the failure, except in the case of a large catastrophic event. In some cases a data center can span multiple data zones, but data replicas within a given data center can be instantiated in different zones. Many other variations are possible, such as overlapping zones, zones at multiple geographic locations, etc. If a primary replica fails or otherwise becomes unavailable, the RDS system can quickly and automatically failover to the secondary replica, resulting in very little downtime or data unavailability.

In one embodiment, a customer is able to create a replicated database instance by calling a specified interface of the Web services layer of the control plane, such as is discussed with respect to FIG. 2. For example, a customer can call a "CreateDBInstance" API specifying aspects such as the instance class, allocated storage, database engine, etc., as the customer would to create a non-replicated data instance. When creating a replicated instance, the customer can include at least one additional parameter, such as a "Replicated" or similar parameter, with a value set to "true" or any other appropriate value indicating that the created instance should be replicated. In some embodiments, the value is set to "false" by default such that non-replicated instances are created unless otherwise specified by the customer. In some embodiments, only certain customers have the ability to create replicated instances, such as a customer who pays for a certain level of service, etc.

In some embodiments, a customer also can select whether the secondary replica is created in a different data zone than the primary replica. The customer in some embodiments also can be allowed to select one or more specific data zones for the instances, or an ordered list, for example, while in other embodiments customers are not able to select the data zone for at least the primary replica. If a customer specifies two data zones and one of the data zones becomes unavailable for an extended period of time, for example, the durability requirements in some embodiments would cause another replica to be generated in a third data zone, and so on. This could require management and updating of orders data zone lists for multiple customers, which can complicate the user experience without providing any significant benefit. Further, it can be easier for applications to spread the associated application fleet across data zones, such that there can be some application fleets located in the same data zone as the secondary replica.

In some embodiments, a customer can call a "DescribeDBInstance" or similar API for the replicated data instance, whereby RDS can list information such as the endpoint DNS name of the primary replica and the data zone in which the primary replica is currently located. Customers can still communicate with the RDS instance using conventional approaches that would be used for a single data zone, as customers can receive the endpoint DNS name of a data store as soon as the status of the RDS instance is "Available," for example, and connect to the instance using the endpoint DNS name. In the event of a replica failure, RDS can failover the database to the corresponding secondary replica, and the endpoint DNS name can will be aliased to the new primary replica. The database endpoint DNS name remains a constant in many embodiments, not changing during the lifetime of the replicated instance.

In some embodiments customers can be provided with the ability to convert a non-replicated instance to a replicated instance, such as by calling a "ModifyDBInstance" or similar API with the Replicated parameter set to "true." This can cause the database to be converted to a replicated instance at an appropriate time, such as during the next maintenance window or immediately after the request, as may depend on the API call parameters, etc.

Various embodiments take advantage of a block-level replication mechanism, such as a kernel module that implements a share-nothing, replicated storage solution mirroring the content of block devices between servers. A block-level replication mechanism ("BLRM") can work on top of block devices (i.e., hard disks or logical volumes). It uses a primary-slave replication architecture wherein the primary replica directs all the updates to the underlying block device. All input and output (I/O) requests to the block device are intercepted by the BLRM kernel module, with all write operations being automatically and synchronously replicated. BLRM provides inherent failure detection of peer devices, and invokes appropriate recovery handlers when a peer node is unreachable. BLRM also can automatically resynchronize a temporarily unavailable node to the latest version of the data, in the background, without interfering with data access at the primary replica. BLRM uses generation identifiers ("GIs") to identify generations of replicated data, whereby BLRM can determine aspects such as whether the two nodes are members of the same replica pair, the direction of background re-synchronization (if necessary), and whether partial or full re-synchronization is needed. A BLRM driver can start a new generation at any appropriate time, such as during the initialization of a replica pair, when a disconnected standby replica is switching to the primary replica, or when a resource in the primary role is disconnecting from the secondary replica. While a block-level replication mechanism is used herein as an example for purposes of explanation, it should be understood that any other appropriate block-level technology or mechanism can be used within the scope of various embodiments.

As discussed, RDS data instances in various embodiments can be built upon one or more systems or platforms. For example, the instances can be built upon a virtual computing environment that enables a customer to utilize Web services or another appropriate approach to launch instances with a variety of operating systems and manager those instances. An example of a Web service providing such a virtual computing environment is the Elastic Compute Cloud (EC2) service offered by Amazon.com, Inc. The data instances also can be built upon a block-level storage mechanism that can provide off-instance storage that persists independently of the life of an instance. A block store mechanism can provide storage volumes that can be attached to an instance and exposed as a device within the instance. An example of a block store platform is provided in co-pending U.S. patent application Ser. No. 12/188,949, filed Aug. 8, 2008, entitled Managing Access of Multiple Executing Programs to a Non-Local Block Data Storage," which is hereby incorporated herein by reference. A logical volume (e.g., LVM layer) can be built on top of the block storage volumes and an appropriate file system, such that the customer database can run on top of the LVM/file system layer. For a replicated database in one embodiment, BLRM can run on top of the LVM layer. BLRM in such an embodiment will intercept all I/O requests and send those requests to the logical volume, which in turn can split the requests across multiple block storage volumes. The use of a logical volume can provide the ability to handle multiple block storage E volumes, as well as the ability to easily expand storage, etc. Layering BLRM on top of LVM also can allow write operations to be replicated across the replicas.

Figure 3:
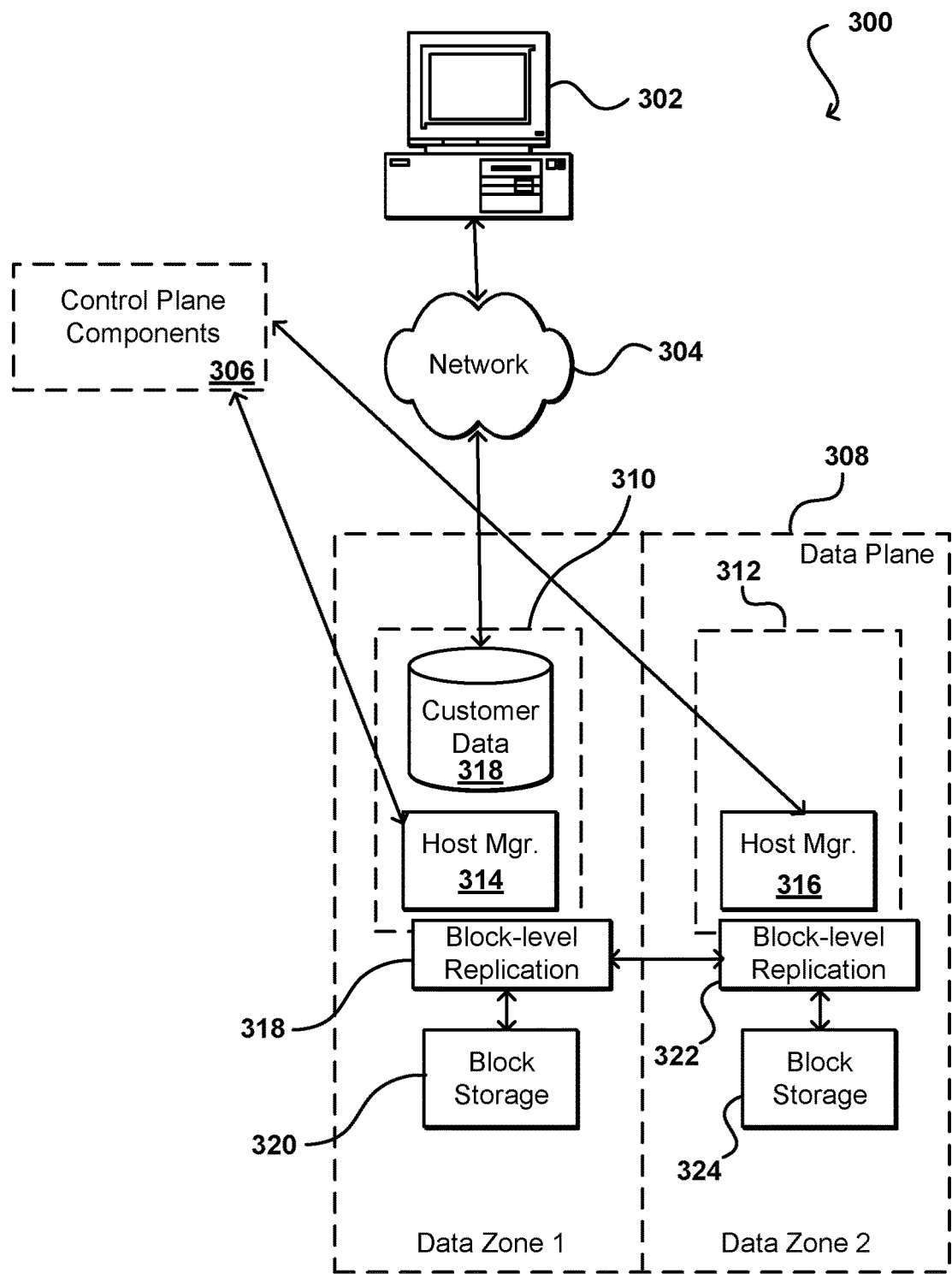
FIG. 3 illustrates an example implementation for running a replicated data instance across multiple data zones that can be used in accordance with one embodiment.

FIG. 3 illustrates an example of a mechanism 300 for implementing a primary-secondary replication model to provide a replicated RDS instance. In this example, the primary replica 310 and the secondary replica 312 are located in different data zones (1 and 2) of the data plane 308, or database environment. Each replica is built on top of the block storage mechanism, here illustrated as a BLRM layer 318, 322 for managing I/O to a block store 320, 322 for each replica. The components of the control plane 306, such as may be similar to those discussed with respect to FIG. 2, are able to create the replicated RDS instance by issuing configuration commands to the local host manager 314, 316, for example, which can perform the necessary setup operations. As seen in the figure, a block-level mechanism such as BLRM 318, 322 is positioned to intercept all I/O requests at the block device level, and write information for the requests to the local disks and the remote disks 320, 324. In this example, the database 318 (e.g., SQL) is run only in the primary replica 310, and all clients 302 run their database transactions on the primary replica 310 (via an appropriate network 304). The database 318 is not run on the secondary replica 312, and a file system also might not be mounted on the secondary replica, as the database will generally not be aware of the updates in the underlying device.

Each database client 302 can automatically discover the current primary replica using an RDS database DNS endpoint name, which can alias to the host name of the primary replica 310. By using DNS to discover the current primary replica, compatibility can be maintained with existing database clients, such as native MySQL clients, JDBC, PHP, C#, and Haskell, for example. While DNS caching can potentially cause clients to attempt to connect to an old primary replica, a client will not be able to talk to the database by connecting to a secondary replica, as no database is run in the secondary replica. The customer can then know to obtain the proper DNS information.

Figure 4:
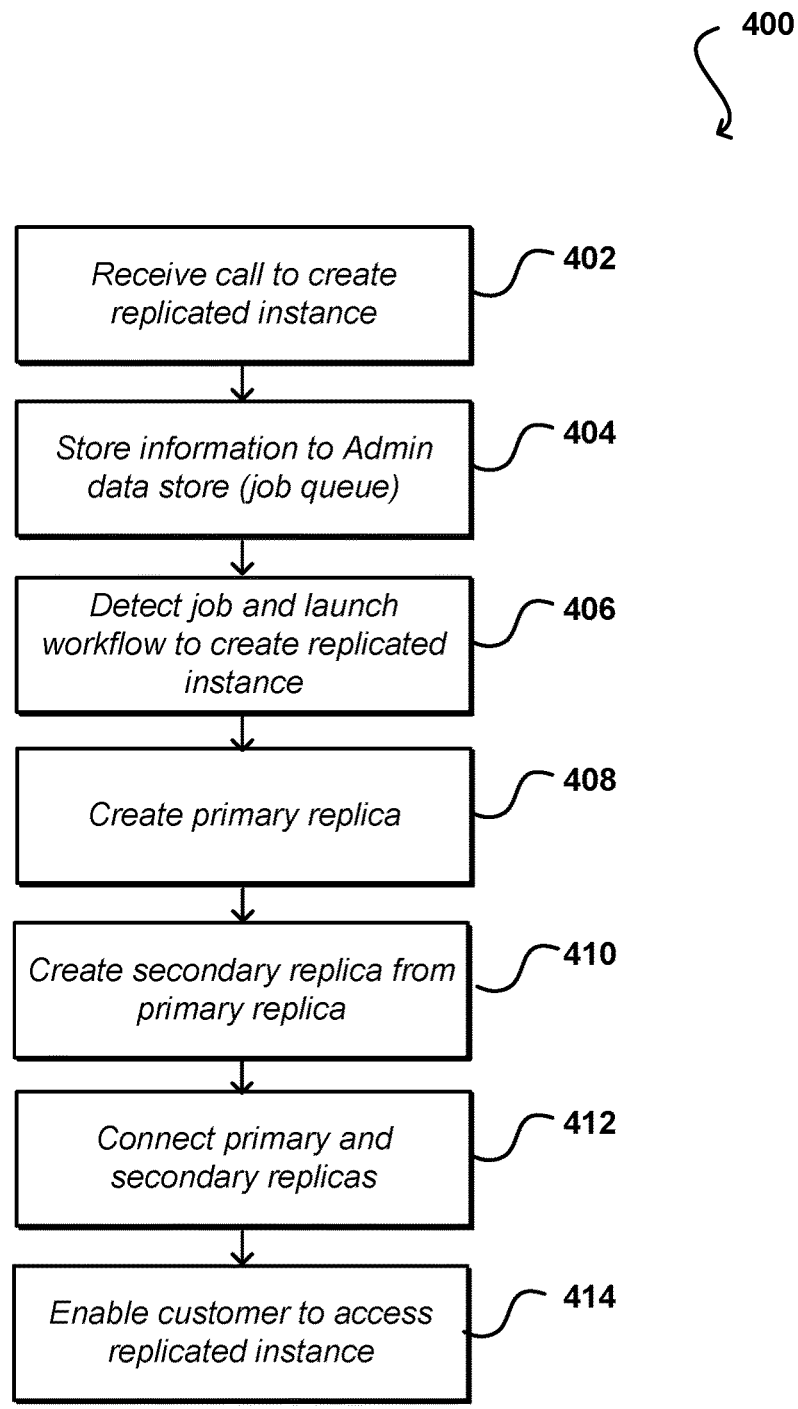
FIG. 4 illustrates an example process for creating a replicated data instance that can be used in accordance with one embodiment.

An example of a process 400 for creating a replicated RDS instance for a customer in accordance with one embodiment is illustrated in FIG. 4. While the term "customer" is used herein to refer to the "owner" of data, or a data store or instance hosted by the RDS system, it should be understood that the term customer is merely an example, and that any appropriate user or developer can be allowed to access the control plane and data plane in the various embodiments. Further, while an embodiment relating to the control of a data environment is described, it should be understood that similar approaches can be used to control and/or manage various other components, devices, applications, services, or other such resources in an environment separate from the control environment. The steps of this process are presented as examples for a particular embodiment, but it should be understood that additional, fewer, and/or alternative steps can be performed in different orders, and/or in parallel or concurrently, within the scope of the various embodiments.

In this example, a customer calls a CreateDBInstance or similar API 402, wherein the components of the Web service tier can analyze the call and cause the database creation parameters supplied by the customer to be stored to the Admin data store 404. The lifecycle of the database can be marked with a value such as "CREATING," upon successfully committing the records to the Admin data store, with a change state of "PENDING" such that the task or job of creating the database will be picked up by a sweeper component. The Web service tier does not directly call the workflow system to kickoff the activity in this embodiment to avoid the two-phase task of launching the activity then verifying that workflow started the task. By simply saving the request for retrieval by a sweeper, no workflow activities will be lost.

As discussed previously, the sweeper periodically polls the Admin data store for new jobs. A database record with a lifecycle and change state of CREATING and PENDING, for example, can cause the sweeper to launch a "CreateDatabase" or similar workflow 406. As an initial task of the workflow, the change state of the database can be updated to a value such as "APPLYING," whereby other sweepers are aware the change is in progress. Other primary tasks of the workflow include creating an instance that will act as the primary replica 408, creating the secondary replica from the primary replica 410, and connecting the secondary replica with the primary replica 412. Once the replicas are connected and available, the RDS instance can be exposed to the customer and accessible using the DNS name 414. In various embodiments, a scale compute for the secondary replica is performed "behind the scenes," whereby the secondary replica can be scaled before connecting the replicas for replication and/or failover.

Figure 5:
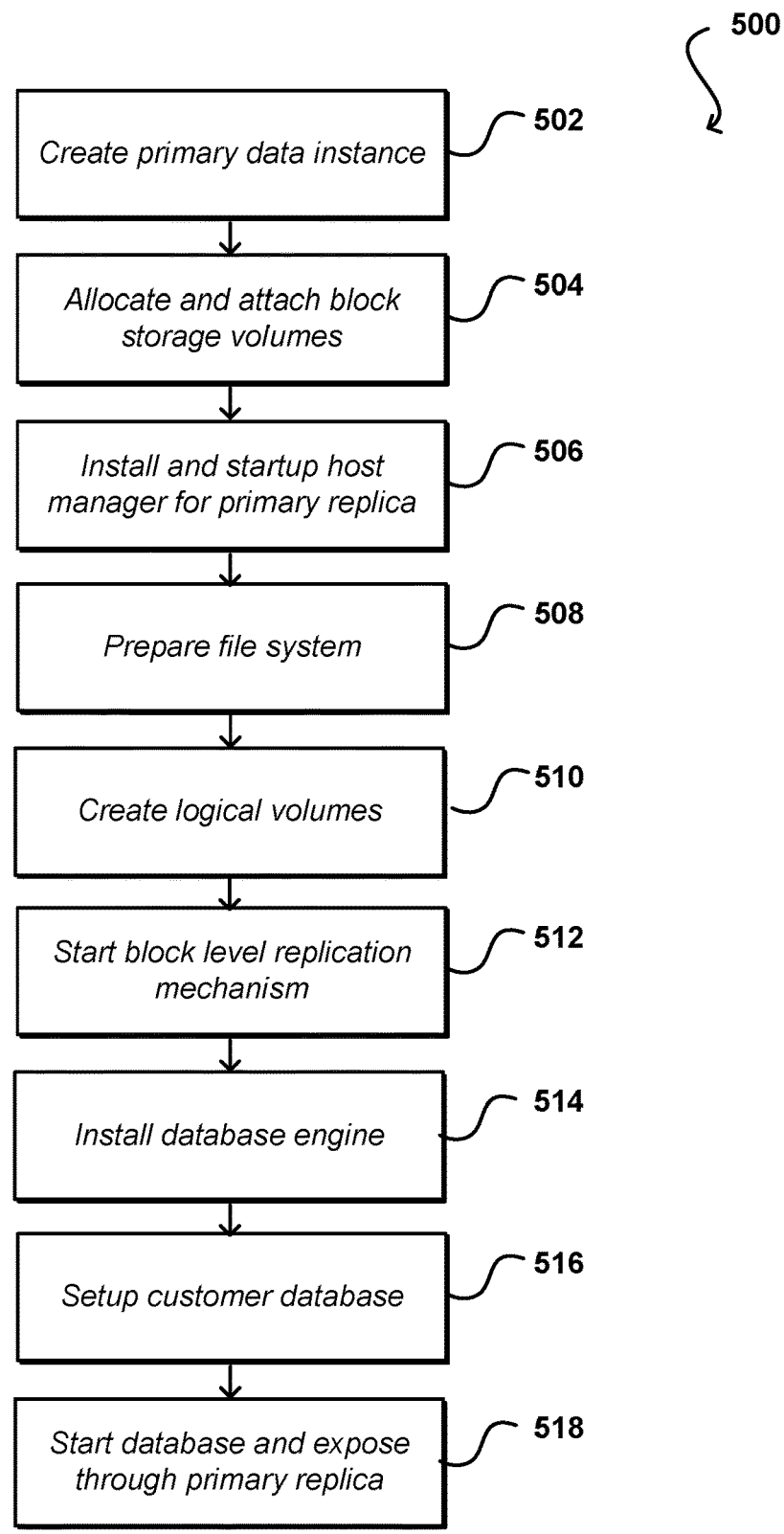
FIG. 5 illustrates an example process for creating a primary replica that can be used in accordance with one embodiment.

FIG. 5 illustrates an example of a portion 500 of such a process that can be used to create the primary replica in accordance with one embodiment. As discussed, a workflow can take the initial steps to provision all the resources that makeup an RDS instance. For example, a data instance is created for the primary host 502, such as by using RDS-specific machine images. The block storage volume can be allocated and attached for the primary host 504. Volumes can be requested based at least in part upon configuration information specifying aspects such as the maximum size of an individual volume and the desired minimum number of volumes. A single volume can be used when reserved IOPS are guaranteed. Once each of the core resources becomes available, the workflow attaches the block storage volumes to the data instance allocated for the primary replica.

In some embodiments, a security group is created that performs functions similar to a firewall for a customer database. A security group can enable a customer to define a range of addresses such as Internet protocol (IP) addresses, for example, that can communicate with the database, or define which data instances can communicate with the database.

The workflow can cause a host manager to be installed and started 506, such as by downloading the host manager, verifying the checksum or otherwise validating the download, and calling an appropriate install interface, such as a Tomcat install application API. Once the host manager is successfully started after installation, the data instance can have the functionality needed to install the database engine and setup the customer database.

The workflow can request various actions to be performed by the host manger for the primary replica once the primary replica is running. For example, the host manager can request that the block storage volumes be mounted and the file system prepared 508. In certain embodiments, the mounting of block storage volumes and building of the file system are performed for each of two roles: a binary role and a data role. In one embodiment, the control plane sends a storage configuration file (e.g., an XML file), which provides the information to the host manager about the mount points and volumes to be used for each role. Using this information, the host manager can create the physical devices for all volumes provisioned for a given role, and can create a logical volume that stripes the data across these devices for each role. Once the logical volumes are created 510, the host manager can create the BLRM configuration information by installing a BLRM configuration file, with itself as the only replica, and starting the BLRM kernel module. Once BLRM is started using the configuration information 512, BLRM can automatically handle all the I/O accesses to the data volume.

The workflow then can install a packet manager (e.g., RPM) public signing key, or other security mechanism, to the host manager for the primary replica. The host manager for the primary replica then can download and install the database engine 514, such as by the host manager on the data instance downloading and verifying the signed information, followed by an unpacking, installation, and launching of the package. Subsequently, the host manager for the primary replica can install a blank database to be used as the basis of the customer database. By starting with an RDS-specific blank database, permissions and tables used for management can be easily applied. The host manager can create the customer database, change the root password for the database, and create a master database user as specified in the customer request 516. The workflow then can start the database 518 (e.g., MySQL).

With the database started, the BLRM resource can be disconnected and the bitmap cleared. The workflow can cause snapshots to be captured for the block storage volumes of the primary host, and the host manager of the primary instance can be instructed to create a new general interface. The host manger then can be instructed to install a new BLRM configuration file with the secondary hostname, and can reload the configuration information.

Figure 6:
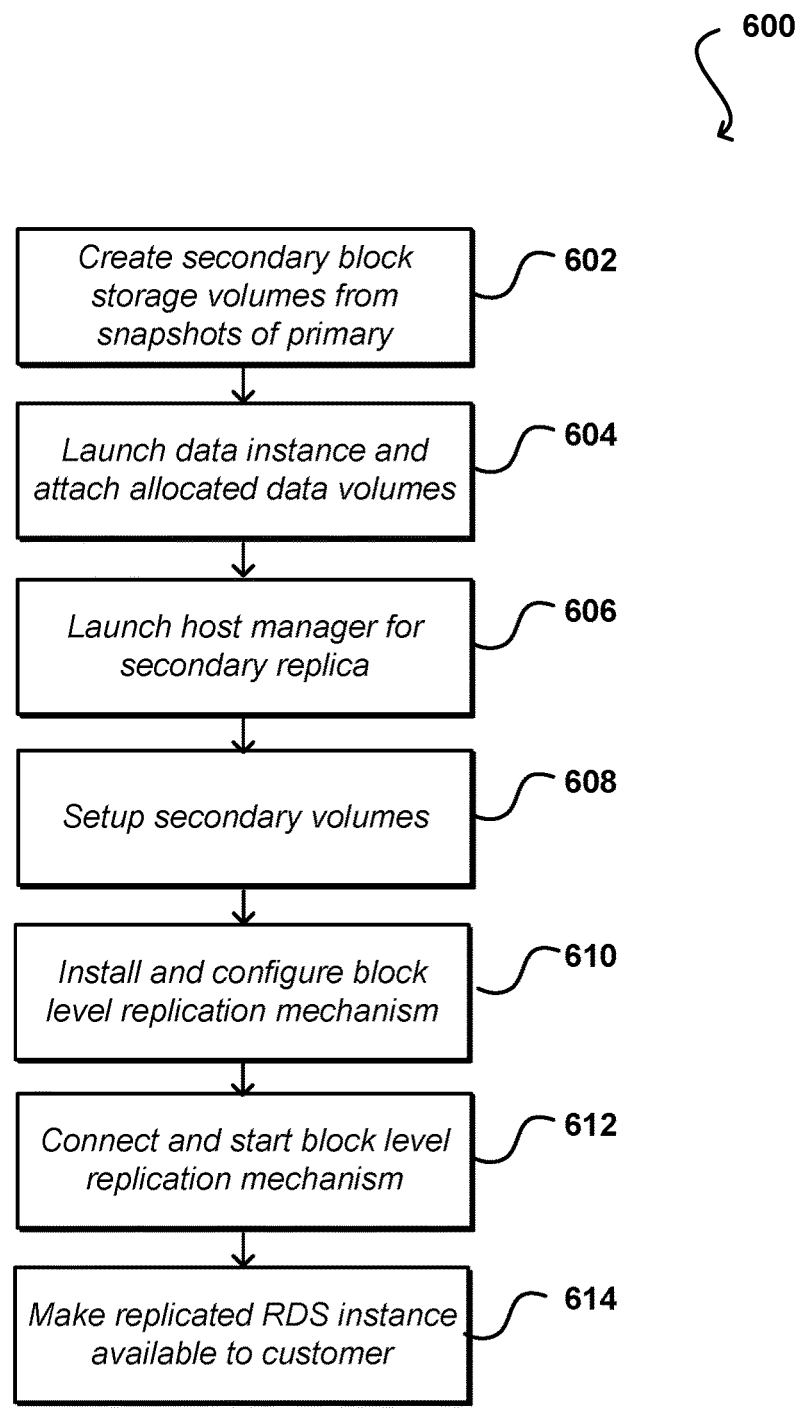
FIG. 6 illustrates an example process for creating a secondary replica that can be used in accordance with one embodiment.

Once at least some of the above tasks of the example workflow are complete, the workflow can move on to tasks directed to building the secondary replica. FIG. 6 illustrates steps of an example process 600 for creating at least one secondary or standby replica that can be used in accordance with various embodiments. As a first task, the block storage volumes can be created from the block storage snapshots of the data volume for the primary replica 602, and a volume can be created for binaries. The workflow then can cause the data instance to be launched, and the allocated volumes attached 604. As discussed, a scale compute can be performed for the secondary replica before connection with the primary replica. The host manager then can be launched for the secondary replica 606. Once the host manager is running for the secondary replica, the workflow can call the host manager to setup the secondary instance. During the setup process, the host manager can setup the volumes 608, install the BLRM configuration file with the appropriate primary and secondary replica configuration 610, determine whether BLRM is installed and start the kernel module, then startup the BLRM handler 612. At this point, the primary and secondary replicas should be connected and synchronizing from the point that the clear-bitmap call was issued. The workflow then can mark the database as "Available" in the Admin data store, and make the instance available to the customer 614.

Once the primary and secondary replicas for an instance are running and available to the customer, the customer can perform any of several actions with respect to the instance. For example, a customer might send a request, to the API or command line tool of the Web services layer, to describe one or more databases. The Web Service can immediately fulfill the request by querying the Admin data store for the current state of the customer database(s) specified in the request. In the event of pending modifications, the current and modified values can be displayed to the customer.

In some situations, a customer might call an API such as a "RebootDBInstance" API in order to reboot a customer database. In one embodiment, this API only enables customers to reboot the database engine and not the RDS instance. The Web services layer can store information to the Admin data store (or another such job queue) whereby the sweeper can pick up information to start a workflow. The workflow can call the host manager of the primary replica to restart the database. The implementation of this API in various embodiments does not differ between a replicated and non-replicated instance.

A customer might send a request to delete a customer database using an API or command line tool, for example, whereby the components of the control plane can be instructed to prepare the deletion. After verification of the credentials and the request parameters, for example, the components of the Web services tier can, for example, verify that the customer database can be deleted at the present time, such as there the lifecycle is not in a CREATING or DELETING state. The components also can update the appropriate record for the customer database in the Admin data store to a lifecycle state of DELETING and change state of PENDING. The workflow sweeper, which periodically polls for tasks to be completed, can identify that the database should be deleted, due to the change state of PENDING, and can launch a workflow instance to complete the deletion. A first action or task of the workflow can be to update the change state of the database to APPLYING, such that other Sweepers are aware the change is in progress.

The workflow instance can pull any remaining event logs and release the resources allocated for primary and secondary replicas. For example, the workflow can direct the RDS event processor to pull events from the RDS instance, then shut down the database and un-mount the file system in the primary replica. The workflow can direct a snapshot to be taken of the database if a final snapshot was requested by the customer, or if policy otherwise dictates. The instance can be de-registered by calling the RDS event processor API to ensure that the event processor system does not monitor the instance anymore. The DNS name can be deleted, and the block storage volumes and data instances released. The workflow can complete deletion by updating the record for this customer database in the Admin data store to a status of DELETED, whereby the record can be moved into the records archive and the record deleted.

It also sometimes can be necessary or desirable for a customer to scale the storage and/or computing capacity allocated for an instance. When scaling storage, for example, volumes can be added to both the primary and secondary replicas, with the LVM being extended. On the primary replica, the BLRM handler can be called to extend the block device to include the new volumes under the control of the block device, and the file system can be resized.

In particular, new block storage volume(s) can be provisioned according to current volume configuration parameters for both the primary replica and the secondary replica. A "ScaleStorage" or similar API can be invoked for the host manager on both instances, which can cause the physical device to be created and the new volumes added to the existing volume group. The host manager can rebalance the space in the volume group, such as by moving LVM physical extents from one physical volume (e.g., block storage volume) to another physical volume. The logical volume also can be extended to encompass the new space. Once the ScaleStorage function completes, the workflow can call an interface such as a "primaryScaleStorage" API for the host manager on the primary interface, which can cause the BLRM block device layer to be extended to use the new space. Once BLRM resizing is complete, the filesystem can be resized. If there are no remaining updates, the record for the customer database in the Admin data store can be set to a lifecycle state of "AVAILABLE", and the change state updated to "NONE". The resized instance can then be utilized by the customer. If the primary or secondary replica is unreachable during the scaling process, the workflow can abort and leave the state in "MODIFYING," for example, and retry at a later time.

When scaling the computing capacity, various embodiments enable a customer to adjust a "compute class" for the instance, with each class having a specified compute capacity allocated. In certain embodiments, the secondary replica is scaled first, with the system then switching over to the secondary replica, such as by using a failover process, whereby the secondary replica becomes the new primary replica. The compute node of the old primary replica then can be scaled as necessary, and the old primary replica can function as the new secondary replica. By scaling the secondary replica first and staging a failover, for example, the replicated instance can experience less downtime that might otherwise occur when scaling an instance class in a single data zone.

The following presents a specific example of a process for scaling a database instance in which the replicated instance has a primary replica P and a secondary replica S. New instances (e.g., P_new and S_new) can be provisioned for both the primary and the secondary replica, with the new instance class, and with the same security group as the existing instances. P_new and S_new can be created in the same data zones as P and S, respectively. The status for the RDS instance in the Admin data store can be updated to a value such as "IN_MODIFICATION". The instance identifiers can be de-registered from the event processors such that when the workflow takes the database down for scaling, recovery of the primary and/or secondary replica is not triggered. The status for the secondary instance can be updated to a value such as "IN_MODIFICATION." On the secondary replica, the host manager can be requested to cease using the existing block storage mechanism by, for example, stopping the database, disconnecting from the primary instance (e.g., by issuing a BLRM disconnect command), unmounting all file systems, and deactivating all volume groups. The block storage volumes can be detached from S and attached to S_new. The host manager then can be installed on S_new, and can be requested to activate the volume groups. The primary replica then can be terminated, such as by shutting down the database and unmounting the volumes, and all the block storage volumes can be detached. The failover to S_new can be initiated by pointing the database endpoint to S_new, thus making S_new the new primary replica. The host manager on S_new can be requested to mount the file system, and credentials (e.g., the RPM public key) can be sent to the host manager on the new instance. The host manager on S_new then can be requested to start the database, and the database can be marked as AVAILABLE. At this stage the database is ready to use, even though the secondary is still under creation. As a next step, the P_new instance can be started and the block storage volumes that were previously attached to P can be attached to P_new. The host manager can be installed on P_new, and the BLRM configuration file installed. In this embodiment, no file system is mounted on P_new at this time. A command then can be issued to the host manager on S_new to connect S_new with P_new, as well as to verify the connection status. The scaled replicas then can be provided for access by the customers.

Embodiments also can allow users to backup information in their instances, such as by creating snapshots or other point-in-time backups. For example, RDS can enable customers to create snapshots of their instances and create new instances from these snapshots. The snapshots also can be used to perform point-in-time recovery for a replicated database. To create snapshots of a non-replicated instance, the workflow effectively suspends I/O to the database volumes, takes block storage-level snapshots of the volumes attached to the instance, and un-suspends the volume. When creating snapshots for replicated instances, the snapshots can be taken at the secondary replica. For this, the secondary replica can be temporarily disconnected and a snapshot taken of all the block storage volumes. After taking the snapshot, the secondary replica can be reconnected. By enabling backups, customers have the ability to restore an instance to a given point in time as long as the time is within the past X days, where X is the retention period for the customer.

When a customer enables backups in a non-replicated instance, snapshots can be taken for the instance at regular intervals, such as every day during a backup window, and the logs can be backed up at other intervals, such as every five minutes. When a customer wants to restore the instance to a specific point in time, such as $t_1$, an instance can be created from a snapshot with a time closest to, but before, the desired point in time, and the logs can be used to roll the state forward to mirror that point in time. In a replicated instance, the snapshots can be taken on the secondary replica while the logs are backed up from the primary replica.

In one embodiment, all communication channels to the host managers are secured using a hypertext transfer protocol over a secure socket layer (SSL). Each application server hosting a host manager application can be started using scripts at boot-up of an instance. Before starting the application server engine, a script can be executed that generates a self-signed certificate and installs the certificate to enable the SSL communication channel(s). SSL communication is used in one embodiment for encrypting the communication channel and not for client authentication. Client authentication is instead achieved with a public/private key signature embedded in each request, such that in one embodiment all clients sign query string parameters using a private key. This signature can be validated by a custom interceptor, which can be deployed with the application server for the host manager. Further, a security group (i.e., firewall rules) can be established for each monitored instance in the data plane such that only hosts sitting in a given network or secure group can communicate using the host manager port. Secure information and credentials (such as private keys) can be stored in an appropriate keystore, which can provide for functionality such as key management and rotation.

As discussed, the log files also can be backed up in a similar fashion. The logs can be used to perform tasks such as replaying various transactions in case the data files have to be restored. The engine logs can be copied to an appropriate storage location, such that previously backed-up log files can be obtained using a simple list command. A host manager will use this result to determine whether there are logs that need to be copied. For example, the host manager can request a bucket list to obtain the list of log files written such that the last sequence can be backed up. If new logs have been created, it can first be determined that the logs are not actively being written to by a database engine, and then the logs can be copied and the copying verified to have been performed successfully.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
 performing, with one or more computing devices:
  receiving, from a user external to the one or more computing devices, a service request to scale storage for a replicated database having a first instance replica and a second instance replica, wherein the replicated database is configured to apply a write operation of the first instance replica to the second instance replica;
  responsive to the received service request, scaling the storage for the first instance replica and the second instance replica; and
  in response to a failure of the first instance replica, remapping a network address of the first instance replica to the second instance replica, wherein after remapping, a received access request addressed to the network address is transmitted to the second instance replica.

2. The method of claim 1, further comprising executing a workflow via a workflow service, wherein the workflow includes scaling the storage for the first instance replica and the second instance replica.

3. The method of claim 2, wherein the workflow service is configured to:
generate a workflow task corresponding to the service request; and
provide a state for the workflow task.

4. The method of claim 3, wherein the workflow task includes at least one of:
modifying an existing number of respective block storage volumes of each of the first instance replica and the second instance replica to a new number of block storage volumes;
causing one or more of the block storage volumes to be rebalanced according to the new number of block storage volumes;
causing one or more respective logical volumes for each of the first instance replica and the second instance replica to be resized according to the new number of block storage volumes; or
causing a respective file system for each of the first instance replica and the second instance replica to be resized according to the new number of block storage volumes.

5. The method of claim 1, wherein the replicated database is further configured to apply the write operation of the first instance replica to the second instance replica.

6. The method of claim 5, further comprising resizing the replication mechanism based at least in part on a respective new configuration for each of the first instance replica and the second instance replica.

7. The method of claim 1, further comprising providing an interface configured to receive one or more service requests, wherein each of the one or more service requests correspond to a respective specified action to be performed at a database, and wherein the one or more service requests includes the service request.

8. The method of claim 1, wherein the network address information includes a domain name system (DNS) name.

9. The method of claim 1, further comprising causing the first instance replica to failover to the second instance replica, wherein scaling the storage for the second instance replica occurs prior to scaling the storage for the first instance replica.

10. A method, comprising:
receiving from a user, a service request to scale computing capacity for a replicated database having a first instance replica and a second instance replica;
in response to the received request, provisioning a third instance replica and a fourth instance replica for the replicated database based at least in part on a specified compute class indicated in the service request, wherein network address information corresponding to the third instance replica is based on network address information corresponding to the first instance replica; and
in response to a failure of the third instance replica, remapping the network address information corresponding to the third instance replica, comprising remapping a network address of the third instance replica to the fourth instance replica, wherein after remapping, a subsequently received access request addressed to the network address is transmitted to the fourth instance replica.

11. The method of claim 10, wherein the third instance replica and the fourth instance replica are provisioned as part of a workflow service, wherein the workflow service is configured to:
generate a workflow task corresponding to the service request; and
provide a state for the workflow task.

12. The method of claim 10, further comprising configuring the replicated database to apply any write operation of the third instance replica to the fourth instance replica.

13. The method of claim 10, further comprising causing the first instance replica to failover to the third instance replica in response to provisioning the third instance replica.

14. The method of claim 13, wherein the third instance replica is provisioned prior to provisioning the fourth instance replica.

15. A non-transitory computer-readable storage medium storing instructions that, when executed on one or more processors, cause the one or more processors to:
receive, from a user, a service request to scale storage for a replicated database having a first instance replica and a second instance replica, wherein the replicated database is configured to apply a write operation of the first instance replica to the second instance replica;
responsive to the received service request, scale the storage for the first instance replica and the second instance replica; and
in response to a failure of the first instance replica, remap a network address of the first instance replica, to the second instance replica, wherein after the remap is complete, a subsequently received access request addressed to the network address is transmitted to the second instance replica.

16. The non-transitory computer-readable storage medium of claim 15, wherein the instructions further cause the one or more processors to execute a workflow via a workflow service in a control environment, wherein the workflow is configured to:
generate one or more workflow tasks; and
provide a respective state for the one or more workflow tasks.

17. The non-transitory computer-readable storage medium of claim 16, wherein the one or more workflow tasks correspond to one or more host tasks to be performed by one or more host managers in a data environment, and wherein the data environment is distinct from the control environment.

18. The non-transitory computer-readable storage medium of claim 15, wherein the instructions further cause the one or more processors to resize a replication mechanism of the replicated database according to a respective new configuration for each of the first instance replica and the second instance replica.

19. The non-transitory computer-readable storage medium of claim 15, wherein the instructions further cause the one or more processors to provide the network address of the first instance replica to enable access to the replicated database via the first instance replica.

20. The non-transitory computer-readable storage medium of claim 15, wherein the service request is based upon at least one of a user request, user preferences, or configuration information.

* * * * *